United States Patent [19]

Haggard et al.

[11] Patent Number: 4,982,719
[45] Date of Patent: Jan. 8, 1991

[54] HYDRAULIC BOW STABILIZER

[75] Inventors: Alan J. Haggard, Holly; Christopher A. Young, Howell, both of Mich.

[73] Assignee: Ace Archers, Inc., Holly, Mich.

[21] Appl. No.: 464,276

[22] Filed: Jan. 12, 1990

[51] Int. Cl.$^5$ .............................................. F41B 5/00
[52] U.S. Cl. ..................................... 124/89; 124/23.1
[58] Field of Search ................... 124/23 R, 86, 88, 89; 267/166.1; 188/317, 322.15

[56] References Cited

U.S. PATENT DOCUMENTS

| | | | |
|---|---|---|---|
| 2,516,172 | 7/1950 | Baldwin | 188/317 X |
| 3,149,541 | 9/1964 | Hutter et al. | 188/317 X |
| 4,245,612 | 1/1981 | Finlay | 124/89 |
| 4,632,228 | 12/1986 | Oster et al. | 188/322.15 X |
| 4,893,606 | 1/1990 | Sisko | 124/89 |

FOREIGN PATENT DOCUMENTS

| | | | |
|---|---|---|---|
| 8600675 | 1/1986 | PCT Int'l Appl. | 188/317 |
| 1130701 | 12/1984 | U.S.S.R. | 188/317 |

Primary Examiner—Randolph A. Reese
Assistant Examiner—Jeffrey L. Thompson
Attorney, Agent, or Firm—Dykema Gossett

[57] ABSTRACT

A hydraulic stabilizer disclosed for reducing shock from firing a bow includes a piston movably received within a hydraulic cylinder. First and second chambers are defined between end caps of the hydraulic cylinder and the axial ends of the piston. The two chambers are connected by a central passage through the center of the piston. O-rings are mounted on the radially outer periphery of the piston and radial passages connect the central passage to the outer periphery of the piston. Conical coil springs are mounted in each of the first and second fluid chambers and bias the piston towards a central position with respect to the hydraulic cylinder. The use of conical coil springs ensures that the piston slows down as it moves towards the ends of the hydraulic cylinder. The improved hydraulic stabilizer reduces shocks from firing of the bow and ensures quieter shooting and more accurate bow operation.

12 Claims, 1 Drawing Sheet

HYDRAULIC BOW STABILIZER

BACKGROUND OF THE INVENTION

This invention relates to a hydraulic stabilizer for use in reducing shock caused when an arrow is fired from a bow to provide quieter and more accurate firing of the arrow from the bow.

Modern bows for hunting or target practice are relatively complex and powerful. When fired, strong vibrations passed through the handle of the bow and are normally absorbed by the arm of the archer. These vibrations are undesirable since they may result in noise that could frighten game or could slightly alter the aim of the shot.

Stabilizers are known in the prior art and are placed on the front of the handle of the bow to absorb shock. Recently, hydraulic stabilizers have begun to be used. In a known prior art hydraulic stabilizer, a piston is mounted within a cylinder such that the cylinder moves in response to a shock in the handle and the piston stays relatively stationary. Hydraulic fluid chambers are created at each end of the piston and aid in reducing this shock. Hydraulic fluids move between the two chambers and cushion the relative movement, reducing the shock. These prior art hydraulic stabilizers have proved quite beneficial. However, they often have metal to metal contact that may be quite noisy. When a hydraulic stabilizer is noisy, it defeats one main purpose of having a stabilizer. In addition, the prior art hydraulic stabilizers do not always smoothly reduce shock and often do not work as quickly as would be desired.

Some prior art stabilizers have utilized plastic cylinders and pistons, however, the plastic cylinders often crack and are thus undesirable.

Thus, it is an object of the present invention to disclose a hydraulic stabilizer that acts quickly and quietly to dampen shock resulting from the firing of a bow.

SUMMARY OF THE INVENTION

The present invention discloses a hydraulic stabilizer having a piston mounted within a cylinder fixed to the handle of a bow in which there is no metal to metal contact between the piston and the cylinder.

In a disclosed embodiment, the piston has a central fluid passage which passes fluid between hydraulic chambers at each end of the piston. By varying the diameter of this central fluid passage, the strength of the hydraulic stabilizer can be easily varied. Radial passages extend from this central passage to the radially outer portion of the piston. O-rings are placed in the outer periphery of the piston at positions axially outwardly of these radial passages. The O-rings provide cushioning preventing contact between the piston and the cylinder. Thus, fluid cannot pass from the hydraulic chamber at one end of the piston to the hydraulic chamber at the other end of the piston about the outer periphery of the piston, but must pass through the central fluid passage. The radial passages supply fluid to the outer periphery of the piston to lubricate and ensure smooth movement of the piston within the cylinder.

In a preferred embodiment of the present invention, the piston is axially centered within the cylinder by a pair of conical coil springs. Conical coil springs ensure that the biasing forces centering the piston increase geometrically as the piston compresses the coil springs. As the piston moves relative to the cylinder and compresses one of the coil springs, the spring force increases and provides a greater biasing force in resistance to further movement of the piston. The relative movement of the piston thus slows down as it nears an end of travel and does not contact the end walls of the cylinder, which could result in unwanted noise.

In a most preferred embodiment of the present invention a bolt for connecting the hydraulic stabilizer to the bow handle is received within an end cap of the cylinder and does not extend inwardly into the cylinder. Again, the lack of metal to metal contact between the cylinder and the piston will ensure quieter operation.

These and other objects and features of the present invention can be best understood from the following specification and drawings of which the following is a brief description.

DETAILED DESCRIPTION OF A PREFERRED EMBODIMENT

Figure 1:
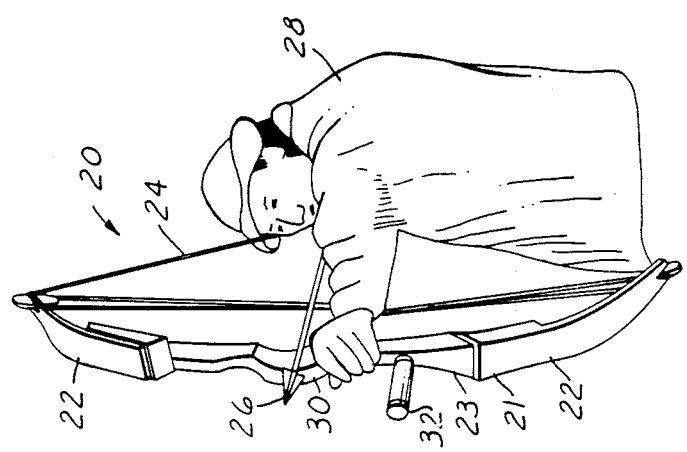
FIG. 1 is a view showing an archer utilizing a bow equipped with a hydraulic stabilizer according to the present invention.

Bow 20 with handle 21 consisting of limbs 22 interconnected by a riser 23 is illustrated in FIG. 1. String 24 is mounted on pulleys and receives arrow 26 for firing by archer 28. Archer 28 grasps handle 21 at grasping portion 30 slightly above the position of hydraulic stabilizer 32.

Figure 2:
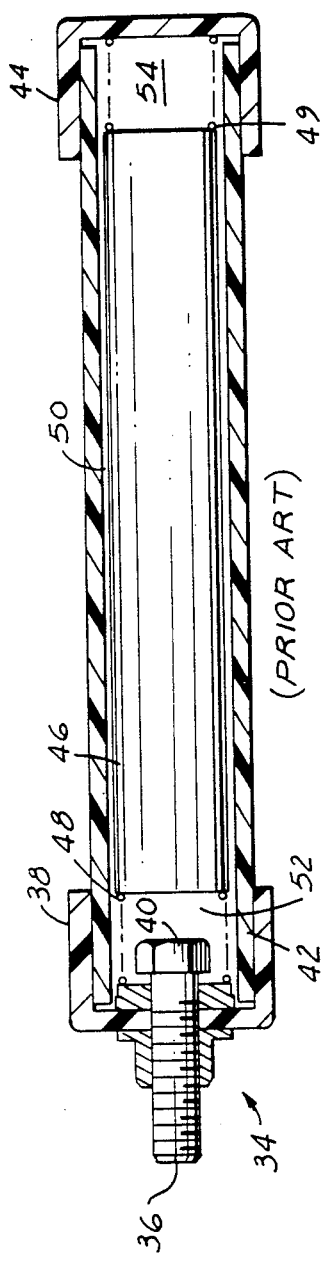
FIG. 2 is a cross-sectional view through a prior art hydraulic stabilizer.

A prior art hydraulic stabilizer 34 is illustrated in FIG. 2, and consists of bolt 36 which is connected to handle 21. End cap 38 defines one end of hydraulic stabilizer 34 with bolt 36 passing through end cap 38 and having head 40 received within an extent of hydraulic cylinder 42. Second end cap 44 is mounted on hydraulic cylinder 42 at the opposed axial end. Piston 46 is disposed within hydraulic cylinder 42 and biased to a central position by a pair of cylindrical coil springs 48 and 49 mounted at each axial end of piston 46. Piston 46 has an outer diameter that is slightly smaller than the inner diameter of hydraulic cylinder 42 such that there is a clearance 50 between the two. Fluid within hydraulic cylinder 42 can pass from a first chamber 52 on one axial end of piston 46 to a second chamber 54 on the opposed axial end of piston 46 through clearance 50.

The operation of hydraulic stabilizer 34, will be described in conjunction with the total combination illustrated in FIG. 1. When arrow 26 is fired by bow 20, shock is transmitted through handle 21. This shock is transmitted through bolt 36 and hydraulic stabilizer 34 moves along with handle 21 in response to the shock. The movement of hydraulic stabilizer 34 would be to the left and right as illustrated in FIG. 2, and hydraulic cylinder 42 will move along therewith. Piston 46, which is centered within hydraulic cylinder 42, will tend to remain relatively stationary with respect to this movement of hydraulic cylinder 42. The fluid within chambers 52 and 54 reduces the shock since it applies forces between end caps 38 and 44 and piston 46 in opposition to further relative movement of piston 46. As hydraulic stabilizer 34 and hydraulic cylinder 42 move to the right as illustrated in FIG. 2, Piston 46 will tend to remain stationary and fluid will be forced from first cylinder 52 towards second cylinder 54. Spring 48 will tend to be compressed and a force will be applied, from both the spring 48 and the fluid, tending to bias end cap 38 towards the left to reduce the shock. When hydraulic stabilizer 34 is moving towards the left as illustrated in FIG. 2, fluid will move from second chamber 54 towards first chamber 52 and right hand spring 49 will be compressed. This will apply a biasing force to end cap 44 and piston 46 in opposition to further relative movement to the left.

It should be understood that this movement of hydraulic stabilizer 34 to the left and to the right is both sudden and relatively uncontrolled. That is, the movement may not be directly parallel to the axis of bolt 36 or a central axis of cylinder 42, but instead may well be slightly skew from these axes. Thus, cylinder 42 may actually be moving a few degrees upwardly or downwardly as it moves to the left and right in FIG. 2. When this happens, there may be metal to metal contact between cylinder 42 and piston 46, resulting in unwanted noise which could scare game that archer 28 may be attempting to hit. In addition, this metal to metal contact will frustrate the smooth reduction of the shock waves and may result in the aim or trajectory of arrow 26 being altered from that which is desired. The presence of bolt head 40 within chamber 52 may result in piston 46 contacting bolt head 40 resulting in further unwanted noise. Clearance 50 may restrict flow and slow relative movement between hydraulic cylinder 42 and piston 46.

Figure 3:
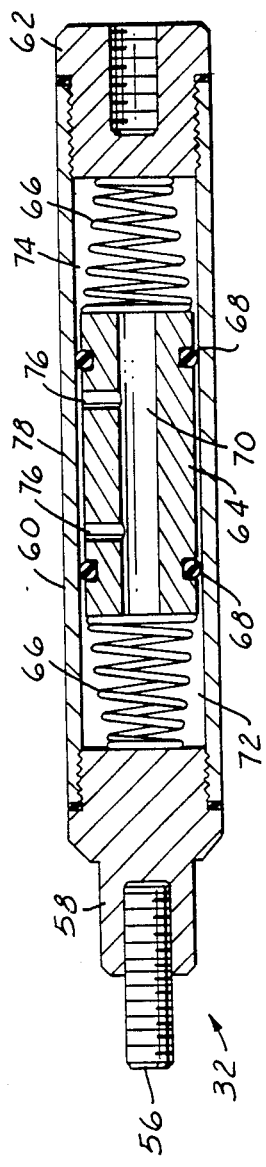
FIG. 3 is a cross-sectional view through a first embodiment of the hydraulic stabilizer of the present invention.

An improved hydraulic stabilizer 32 according to the present invention is illustrated in FIG. 3. Bolt 56 is received within end cap 58 and does not extend into cylinder 60. End cap 62 is mounted at the opposite axial end of cylinder 60 and piston 64 is centered between end caps 58 and 62 by two conical coil spring 66 and 67. Each conical coil spring 66 and 67 includes a first smaller diameter portion in contact with cylinder 60 and a second greater diameter portion in contact with piston 64. The use of conical coil springs 66 and 67 results in a combination such that piston 64 will encounter a higher biasing force as it continues to move towards the left or right after initially moving. That is, as coil spring 66 becomes compressed, the spring force it applies to piston 64 increases. This slows the relative movement between cylinder 60 and piston 64 near the ends of travel.

O-rings 68 are mounted in the outer periphery of piston 64 and provide cushion to ensure that there will be no metal to metal contact between piston 64 and cylinder 60. They also prevent flow of hydraulic fluid around the outer periphery of piston 64.

A central fluid passage 70 extends axially through the center of piston 64 and interconnects first chamber 72 with second chamber 74. By selecting the diameter of central fluid passage 70, the strength of hydraulic stabilizer 32 may be easily varied. Radial passages 76 connect central fluid passage 70 to clearance 78 at the outer periphery of piston 64 to provide lubrication ensuring smooth movement of piston 64 relative to cylinder 60.

With improved hydraulic stabilizer 32 there should be no contact between piston 64 and cylinder 60. O-rings 68 are spaced between the radially outer periphery of piston 64 and the radial inner periphery of cylinder 60 and should cylinder 60 move on an axis other than directly left and right as shown in FIG. 3, the O-rings 68 will provide cushioning to prevent contact between piston 64 and cylinder 60. Conical coil springs 66 and 67 ensure that piston 64 is prevented from contacting end caps 58 or 62 by applying an increasingly greater force to piston 64 as it approaches either end cap 58 or 62. Since bolt 56 does not extend into chamber 72 piston 64 does not contact a bolt head.

These differences result in an improved hydraulic stabilizer that ensures that the firing of the bow will be much quieter than the Prior art. In addition, the improved hydraulic stabilizer 32 ensures accurate firing and that shocks applied to handle 21 will not alter the aim or trajectory of arrow 26.

Figure 4:
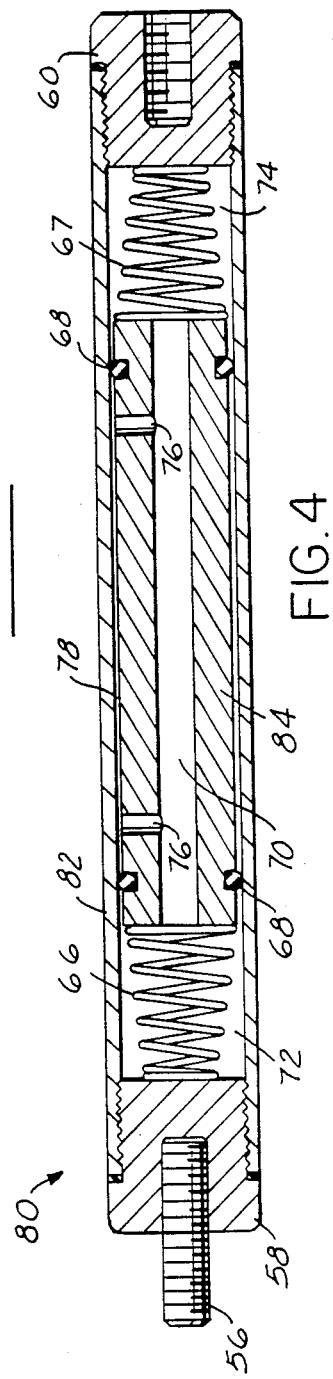
FIG. 4 is a cross-sectional view through a second embodiment of the hydraulic stabilizer of the present invention.

A second embodiment 80 of the hydraulic stabilizer according to the present invention is illustrated in FIG. 4. Hydraulic stabilizer 80 is for use with a stronger bow and reduces higher shock levels. In hydraulic stabilizer 80, cylinder 82 and piston 84 are relatively longer when compared to their diameter than in the first embodiment of hydraulic stabilizer 32.

Preferred embodiments of the present invention have been disclosed, however, a worker of ordinary skill in the art would realize that certain modifications would come within the scope of this invention and thus the following claims should be studied in order to determine the true scope and content of the invention.

We claim:

1. A bow comprising:
   a handle and a string;
   a hydraulic stabilizer connected to said handle, said hydraulic stabilizer having a axially extending cylinder defining two piston therein, said piston being movable axially within said cylinder, first and second hydraulic chambers being defined between each axial end of said cylinder and said piston and containing hydraulic fluid;
   a passage formed at a central portion of said piston and interconnecting said first and second hydraulic chambers, and means for preventing flow of said hydraulic fluid between said first and second chambers at an outer periphery of said piston.

2. A bow as recited in claim 1, wherein said means for preventing flow include said piston has at least one O-ring mounted in a radially outer periphery and being in contact with an inner periphery of said cylinder.

3. A bow as recited in claim 2, wherein said passage comprises a first axially extending central passage, said first axially extending central passage having radial passages extending from said central passage to the radially outer periphery of said piston, there being two of said O-rings, one being mounted axially closer to each of said two axial ends of said cylinder from said radial passages.

4. A bow as recited in claim 3, wherein said first and second chambers each receive a conical coil spring, each said conical coil spring having a first smaller diameter portion in contact with an end of said cylinder and a second greater diameter portion in contact with said piston.

5. A bow as recited in claim 1, wherein said passage comprises a first axially extending central passage, said first axially extending central passage having radial passages extending from said central passage to the outer periphery of said piston.

6. A bow as recited in claim 5, wherein said first and second chambers each receive a conical coil spring, each said conical coil spring having a first smaller diameter portion in contact with an end of said cylinder and a second greater diameter portion in contact with said piston.

7. A bow as recited in claim 1, wherein said first and second chambers each receive a conical coil spring, each said conical coil spring having a first smaller diameter portion in contact with an end of said cylinder and a second greater diameter portion in contact with said piston.

8. A bow as recited in claim 1, wherein said cylinder has end caps at each axial end and a bolt for connecting said hydraulic stabilizer to said handle, one end of said bolt being totally received within one of said end caps.

9. A bow comprising:
a handle and a spring;
a hydraulic stabilizer being fixed to said ha*dIe, said hydraulic stabilizer comprising an axially extending cylinder defining two axial ends and receiving a piston, said piston being movable axially within said cylinder, first and second chambers defined between said two axial ends of said cylinder and said piston and containing hydraulic fluid; and conical coil springs mounted within each of said first and second chambers and biasing said piston to an axially central position within said cylinder, said conical coil springs each having a first lesser diameter end and a second greater diameter end, said first lesser diameter end being in contact with said cylinder and said second greater diameter end being in contact with said piston said piston receiving a pair of O-rings at a radially outer periphery.

10. A bow as recited in claim 9, wherein said piston has a Passage interconnecting said first and second chambers.

11. A bow as recited in claim 9, wherein said passage comprises a first axially extending central passage, said first axially extending central passage having radial passages extending to the outer periphery of said piston, and there being two of said O-rings, one belng mounted axially towards each of said two axial ends of said cylinder from said radial passages.

12. A bow as recited in claim 11, wherein said cylinder has end caps at each axial end and a bolt for connecting said hydraulic stabilizer to said handle, one end of said bolt being totally received within one of said end caps.

* * * * *